United States Patent [19]

Bent et al.

[11] 4,409,779
[45] * Oct. 18, 1983

[54] LAWN MOWER WITH COMBINED CLUTCH AND SELF BIASING BRAKE

[75] Inventors: F. Eugene Bent, Oneida; Irvin M. White, Galesburg, both of Ill.

[73] Assignee: Outboard Marine Corporation, Waukegan, Ill.

[*] Notice: The portion of the term of this patent subsequent to Dec. 29, 1998 has been disclaimed.

[21] Appl. No.: 293,355

[22] Filed: Aug. 17, 1981

Related U.S. Application Data

[63] Continuation of Ser. No. 171,415, Jul. 23, 1980, Pat. No. 4,307,558.

[51] Int. Cl.³ .............................................. A01D 69/10
[52] U.S. Cl. ...................................... 56/11.3; 56/11.6; 192/11
[58] Field of Search .................... 56/11.3, 11.6, 11.7; 192/10, 11, 17 R; 188/166, 167, 77 R

[56] References Cited

U.S. PATENT DOCUMENTS

| | | | |
|---|---|---|---|
| 2,857,638 | 10/1958 | Ribiero | 188/166 |
| 2,957,561 | 10/1960 | Musgrave | 192/11 |
| 3,367,459 | 2/1968 | Rubin | 56/11.6 |
| 3,376,954 | 4/1968 | Neptune | 188/167 |
| 3,943,785 | 3/1976 | Perlifield | 56/11.6 |
| 4,058,957 | 11/1977 | Roseberry | 56/11.3 |
| 4,159,049 | 6/1979 | Merz | 192/17 R |
| 4,307,558 | 12/1981 | Bent et al. | 56/11.3 |

FOREIGN PATENT DOCUMENTS 280896 3/1928 United Kingdom ............... 56/11.3

Primary Examiner—Robert A. Hafer
Attorney, Agent, or Firm—Michael, Best & Friedrich

[57] ABSTRACT

Disclosed herein is a lawn mower comprising a prime mover mounted on a housing and including an output shaft extending into the housing, a first pulley sheave fixed to the output shaft for common rotation therewith and including an inclined surface, a blade assembly mounted on the output shaft for relative rotation therebetween and including a cutter blade, and a combined pulley sheave and brake drum fixed to said cutter blade, which combined pulley sheave and brake drum includes a pulley sheave portion comprising an inclined surface facing the inclined surface of the first pulley sheave and a brake drum portion, an endless member trained between the inclined surfaces, an idler pulley around which the endless member is trained and mounted on the housing for movement between a first position locating the idler pulley to remove slack from the endless belt, thereby drivingly connecting the first and second sheaves for common rotation, and a second position locating the idler pulley to permit slack in the endless member, thereby permitting relative rotation between the first and second sheaves, a brake band anchored at one end to the housing and movable between a braking position engagable with the brake drum portion and a non-braking position spaced from the brake drum portion, which brake band is fabricated of resilient material and is self-biasing into the braking position, which brake band is also connected to the idler pulley so as to bias the idler pulley to the second position, and a handle adapted to be operated by a user for displacing the idler pulley to the first position and the brake band to the non-braking position against the biasing action of the brake band.

9 Claims, 3 Drawing Figures

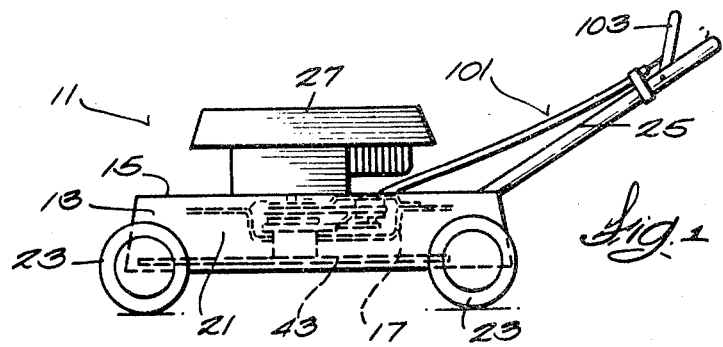
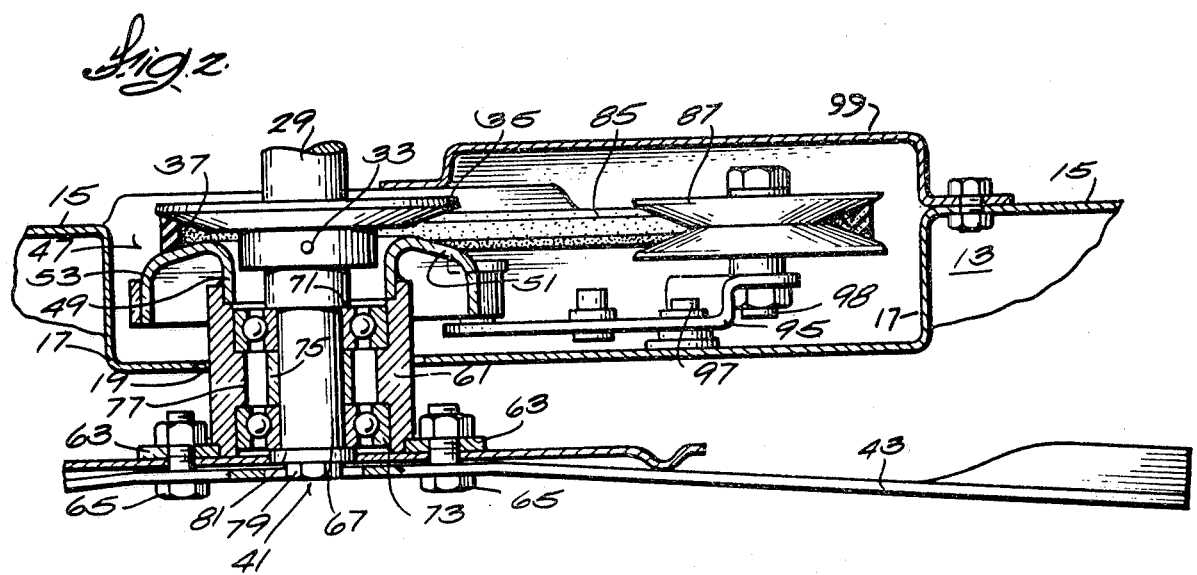
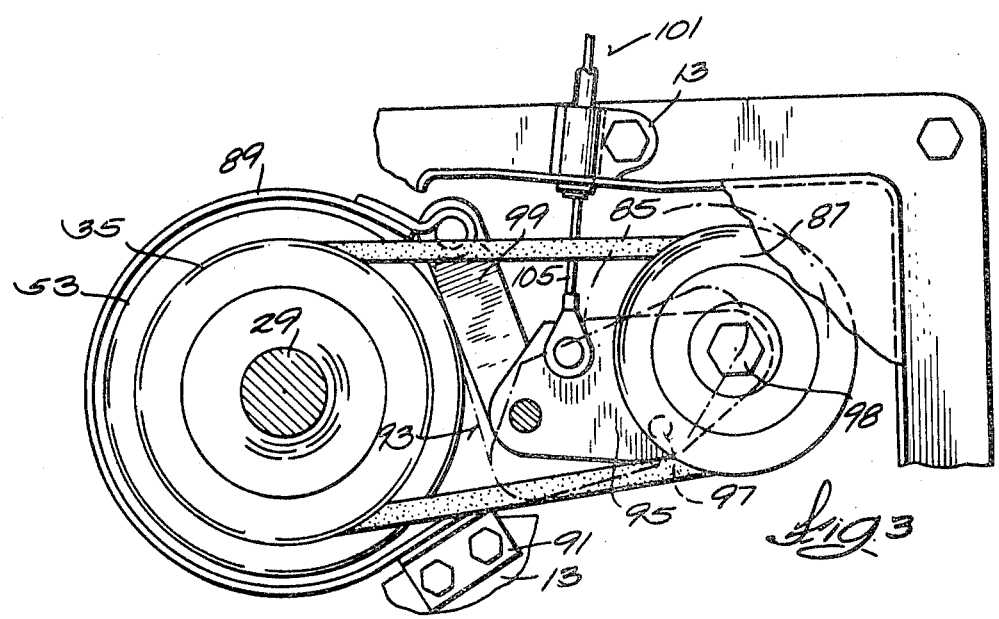

LAWN MOWER WITH COMBINED CLUTCH AND SELF BIASING BRAKE

RELATED APPLICATION

This is a continuation of application Ser. No. 171,415 filed July 23, 1980, now U.S. Pat. No. 4,307,558, granted Dec. 29, 1981.

BACKGROUND OF THE INVENTION

The invention relates generally to rotary lawn mowers and, more particularly, to arrangements for selectively driving and braking a cutter blade. Still more particularly, the invention relates to the transmission of driving power from a prime mover to a cutter blade through two sheaves around which an endless belt is trained.

Attention is directed to the U.S. Musgrave U.S. Pat. No. 2,957,561, issued Oct. 25, 1960, to the U.S. Roseberry U.S. Pat. No. 4,058,957 issued Nov. 22, 1977, and to the U.S. Hutchison U.S. Pat. No. 4,186,545 issued Feb. 5, 1980.

While the above patents relate generally to lawn mowers and arrangements for selectively driving and braking a cutter blade, none of these patents provides an arrangement which is believed to be, at the same time, both economical, sturdy, and as compact as that disclosed herein.

SUMMARY OF THE INVENTION

The invention provides a lawn mower comprising a housing, a prime mover mounted on the housing and including an output shaft extending into the housing, a first pulley sheave fixed to the output shaft for common rotation therewith and including an inclined surface, a blade assembly mounted on the output shaft for relative rotation therebetween and including a cutter blade, and a combined pulley sheave and brake drum fixed to the cutter blade, which said combined pulley sheave and brake drum includes a pulley sheave portion comprising an included surface facing said inclined surface of the first pulley sheave, and which combined pulley sheave and brake drum also includes a brake drum portion, an endless member trained between the inclined surfaces, an idler pulley around which the endless member is trained, means mounting the idler pulley on the housing for movement between a first position locating the idler pulley to remove slack from the endless belt, thereby drivingly connecting the first and second sheaves for common rotation, and a second position locating the idler pulley to permit slack in the endless member, thereby permitting relative rotation between the first and second sheaves, a brake band anchored at one end to the housing and movable between a braking position engageable with the brake drum portion and a non-braking position spaced from the brake drum portion, which brake band is fabricated of resilient material and is self-biasing into the braking position, which brake band is also connected to the idler pulley so as to bias the idler pulley to the second position, and means adapted to be operated by a user for displacing the idler pulley to the first position and the brake band to the non-braking position against the biasing action of the brake band.

In one embodiment of the invention, the blade housing includes a top deck having therein an upwardly open central recess and the first pulley sheave, the combined pulley sheave and brake drum, the endless member, the idler pulley, and the brake band, are located in said recess.

In one embodiment of the invention, the recess includes therein a central opening, the cutter blade is located within the housing below the top deck, and the blade assembly extends through the aperture.

In one embodiment of the invention, the resilient material is spring steel.

In one embodiment of the invention, the brake band has a diameter which, when relaxed, is less than the diameter of the brake drum portion.

In one embodiment of the invention, the combined sheave and brake drum comprises a unitary member having a relatively thin thickness and including a sleeve portion extending co-axially with the output shaft and having opposed upper and lower ends, wherein the inclined sheave portion extends from the upper sleeve end and radially outwardly and downwardly and has an outwardly circular peripheral margin, wherein the cylindrical brake drum portion extends downwardly from the outer peripheral margin of the sheave portion in outwardly spaced relation from the sleeve portion, and wherein the cutter blade is fixed to the lower sleeve end.

Other features and advantages of the embodiments of the invention will become known by reference to the following general description, claims and appended drawings.

IN THE DRAWINGS

FIG. 1 is a side elevational view of a lawn mower incorporating various of the features of the invention.

FIG. 2 is an enlarged fragmentary view, partially in section, of a portion of the lawn mower shown in FIG. 1.

FIG. 3 is a partially schematic top view of the mechanism shown in FIG. 2 with parts omitted.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a lawn mower 11 comprising a housing 13 including a top deck 15 having therein a central upwardly open recess 17 including then a central aperture 19. The housing 13 also includes a depending wall 21, is supported for travel over the ground by a plurality of wheels 23, and is guided for travel by a handle structure 25.

Mounted on the top deck 15 is a prime mover 27 which can either be an electric motor or an internal combustion engine and which includes a output shaft 29 extending through the central aperture 19 in the housing 13 and centrally of the depending wall 21.

Fixed to the output shaft within the housing recess 17 by a pin 33 or other suitable means, such as a tapered drive surface on the output shaft 27, is a first sheave 35 which includes an included or truncated conical surface 37.

Rotatably carried partially within the housing recess 17 and partially within the housing 13 by the output shaft 29 is a cutter blade assembly 41 which includes a cutter blade 43 to which is fixed a combined pulley sheave and brake drum 47. More particularly, the combined pulley sheave and brake drum 47 is fabricated from a unitary piece of material having a relatively thin thickness so as to minimize weight and includes an inner hub or sleeve portion 49, a radially outwardly inclined or truncated conical surface providing a sheave portion 51 which extends from the top of the hub or sleeve portion 49, and an annular or cylindrical portion which extends downwardly from the radially outer periphery of the inclined surface 51 and which constitutes a brake drum 53.

The lower end of the inner hub 49 is secured by welding or otherwise to the upper end of a sleeve or hub 61 which, at its other end, is suitably fixed, as by welding or otherwise, to a flange 63 to which the cutter blade 43 is bolted or otherwise secured as indicated at 65.

The blade assembly 41 is carried for rotation on a reduced diameter lower portion 67 of the output shaft 29 by upper and lower bearings 71 and 73 which are spaced axially of the output shaft 29 and separated by a spacer 75 carried on the output shaft 29 and by an annular shoulder 77 which projects radially inwardly from the sleeve or hub 61.

The blade assembly 41 is retained on the output shaft 29 by a bolt 79 which is threaded into the bottom of the output shaft 29 and which passes through and engages a washer 81 which, in turn, engages the lower bearing 73.

The sheaves 35 and 51 are drivingly coupled together by means including an endless member 85, such as a V-belt, which is trained between the sheaves 35 and 51 and an idler pulley 87 about which the endless belt 85 is also trained and which is moveable between a driving position which engages the endless belt or member 85 so as remove slack therefrom, and thereby to drivingly connect the sheaves 35 and 51 and a non-driving or disengaged position in which slack is permitted in the endless belt or member 85, thereby permitting relative rotation between the sheaves 35 and 51.

Cooperating with the brake drum 53 is a brake band 89 which is fabricated of resilient material, preferably spring steel, and which can include a flexible brake lining (not shown). The brake band 89 is anchored, at one end, on a bracket 91 fixed to the housing 13 and is moveable between a braking position in braking engagement with the brake drum 53 and a non-braking position clear of the brake drum 53.

The brake band 89 is preferably fabricated so that, when relaxed, the diameter thereof is less than the diameter of the brake drum 53. As a consequence, the brake band 89 is self-biased into the braking position.

Coordinated activity of the idler pulley 87 and brake band 89 are provided by a linkage 93 which connects the brake band 89 to the idler pulley 87 and which serves to bias the idler pulley 87 to the disengaged position affording slack in the endless member 85. Thus, when the brake band 89 is in the braking position, the idler pulley 87 is in a disengaged or non-driving position. More particularly, the linkage 93 includes a member or lever 95 which is mounted for pivotal movement between a run position shown in full lines in FIG. 3 and a brake position shown in dotted lines in FIG. 3 about a stud 97 fixed to the housing 13.

Still more particularly, the idler pulley 87 is mounted on the member 95 about a post 98 for rotation relative thereto and for pivotal movement in common with the member or lever 95. In addition, the free or other end of the brake band 89 is pivotally connected to a link 99 which, in turn, is pivotally connected to the member or lever 95. As a consequence, when the brake band 89 is located in the non-braking position, the member 95 is in the run position, and the idler pulley 87 is located in the drive position, removing slack from the endless belt 85. When the brake band 89 is in the braking position, the pivotal member or lever 95 is in the brake position and the idler pulley 87 is in the position permitting slack in the endless belt 85, thereby permitting relative rotation between the sheaves 35 and 51. As shown in FIG. 2 the recess 17 is partially covered by a guard 99.

Also connected to the lever or member 95 is an operating linkage 101 which includes a handle grip 103 pivotally mounted on the handle structure 25 and a cable 105 or other linkage connecting the handle grip 103 and the member or lever 95 so that, in response to squeezing of the handle grip 103 toward the handle structure 25, the brake band 89 is moved against its self bias from the braking position to the non-braking position and the idler pulley is moved from the disengaged position to the drive position, thereby drivingly connecting the prime mover 27 to the cutter blade 43. Accordingly, the handle grip 103 must be held close to the handle structure 25 to disengage the brake and drivingly couple the prime mover 27 to the cutter blade 43.

It is particularly noted that the first sheave 35, the combined sheave and brake drum 47, the endless belt 85, the idler pulley 37 and the brake band 89 are all located in the upwardly open recess 17 directly below the prime mover 27 and not below the top deck 15 within the housing 13. Thus, this arrangement removes the clutch and brake mechanism from the dirty environment of the housing 13 and locates this mechanism directly under the prime mower 27, without materially increasing the height of the mower, thereby obtaining an especially compact arrangement.

In addition, the cutter blade assembly 41 and particularly the combined sheave and brake drum 47 are of light weight, yet sturdy construction facilitating quick braking of the cutter blade without affecting prime mover operation.

Various of the features of the invention are set forth in the following claims.

We claim:

1. A rotary lawn mower comprising a housing, pulley means rotatably supported by and mounted in said housing, a blade assembly connected to said pulley means for rotation thereby and including a cutter blade, and a brake drum fixed relative to said cutter blade, an endless member trained around said pulley means, an idler pulley around which said endless member is trained, means mounting said idler pulley on said housing for movement between a first position locating said idler pulley to remove slack from said endless belt, and a second position locating said idler pulley to permit slack in said endless member, a brake band anchored at one end to said housing and movable between a braking position engageable with said brake drum and a non-holding position, said brake band being fabricated of resilient material and being self-biasing into said braking position, said brake band also being connected to said idler pulley so as to bias said idler pulley to said second position, and means adapted to be operated by a user for displacing said idler pulley to said first position and said brake band to said non-braking position against the biasing action of said brake band.

2. A lawn mower in accordance with claim 1 wherein said resilient material is spring steel.

3. A lawn mower in accordance with claim 1 wherein said brake drum has a diameter, and wherein said brake band has a diameter which, when relaxed, in less than said diameter of said brake drum.

4. A rotary lawn mower comprising a housing, a rotary cutter blade located in said housing, a brake drum fixed relative to said cutter blade, a brake band anchored at one end to said housing and movable between a braking position engageable with said brake drum and a non-braking position spaced from said brake drum, said brake band being fabricated of resilient material and being self-biased into said braking position, and means adapted to be operated by a user for displacing said brake band to said non-braking position against the biasing action of said brake band.

5. A lawn mower in accordance with claim 4 wherein said resilient material is spring steel.

6. A lawn mower in accordance with claim 4 wherein said brake drum has a diameter, and wherein said brake band has a diameter which, when relaxed, in less than said diameter of said brake drum.

7. A lawn mower comprising a housing, a prime mover mounted on said housing and including an output shaft, a blade assembly mounted on said output shaft for relative rotation therebetween and including a cutter blade located in said housing and a brake drum fixed to said cutter blade, clutch means for selectively drivingly connected said output shaft to said blade assembly for common rotation, actuating means connected to said clutch means and being selectively movable between a first position causing driving connection of said output shaft and said blade assembly by said clutch means and a second position causing disengagement of said clutch means from said driving connection, a brake band anchored at one end to said housing and movable between a braking position engageable with said brake drum and a non-braking position spaced from said brake drum, said brake band being fabricated of resilient material and being self-biasing into said braking position, said brake band also being connected to said actuating means so as to bias said actuating means to said second position, and means adapted to be operated by a user for displacing said actuating means to said first position and said brake band to said non-braking position against the biasing action of said brake band.

8. A lawn mower in accordance with claim 7 wherein said resilient material is spring steel.

9. A lawn mower in accordance with claim 7 wherein said brake drum has a diameter, and wherein said brake band has a diameter which, when relaxed, in less than said diameter of said brake drum.

* * * * *